US012709545B2

(12) United States Patent
Masuda et al.

(10) Patent No.: US 12,709,545 B2
(45) Date of Patent: Aug. 18, 2026

(54) SILICON CARBIDE POWDER AND MANUFACTURING METHOD FOR SAME

(71) Applicant: FUJIMI INCORPORATED, Kiyosu (JP)

(72) Inventors: Yuji Masuda, Kiyosu (JP); Taira Otsu, Kiyosu (JP); Mina Sato, Kiyosu (JP); Naoki Ushida, Kiyosu (JP); Takuya Isayama, Kiyosu (JP); Haruna Inagaki, Kiyosu (JP); Naomi Ban, Kiyosu (JP)

(73) Assignee: FUJIMI INCORPORATED, Kiyosu (JP)

( * ) Notice: Subject to any disclaimer, the term of this patent is extended or adjusted under 35 U.S.C. 154(b) by 562 days.

(21) Appl. No.: 18/191,971

(22) Filed: Mar. 29, 2023

(65) Prior Publication Data

US 2023/0312353 A1 Oct. 5, 2023

(30) Foreign Application Priority Data

Mar. 30, 2022 (JP) ................................. 2022-057193
Feb. 9, 2023 (JP) ................................. 2023-018590

(51) Int. Cl.
*C01B 32/956* (2017.01)

(52) U.S. Cl.
CPC ........ *C01B 32/956* (2017.08); *C01P 2004/04* (2013.01); *C01P 2004/51* (2013.01); *C01P 2004/90* (2013.01)

(58) Field of Classification Search
CPC ............... C01B 32/956; C01P 2004/04; C01P 2004/51; C01P 2004/90
See application file for complete search history.

(56) References Cited

FOREIGN PATENT DOCUMENTS

JP 2013-245374 A 12/2013

OTHER PUBLICATIONS

Eray, Esra, Victor Manuel Candelario, and Vittorio Boffa. "Ceramic processing of silicon carbide membranes with the aid of aluminum nitrate nonahydrate: preparation, characterization, and performance." Membranes 11.9 (2021): 714.*

Dioktyanto, Mudzakkir, et al. "Enhance the density of silicon carbide with the addition of nitrate-based additives." Journal of Mining and Metallurgy, Section B: Metallurgy 58.3 (2022): 389-395.*

* cited by examiner

*Primary Examiner* — Richard M Rump

(74) *Attorney, Agent, or Firm* — Foley & Lardner LLP

(57) ABSTRACT

The silicon carbide powder is a powder of silicon carbide having an α-type crystal system, where the number of small corner portions among corner portions on a surface of a primary particle of silicon carbide constituting the powder of silicon carbide is 2.5 or less per one primary particle. The small corner portion is a corner portion, among corner portions present in a contour of the primary particle in a projection image of the primary particle, where twice a curvature radius of the corner portion is ⅕ or less of a Heywood diameter of the projection image of the primary particle.

11 Claims, 4 Drawing Sheets

SILICON CARBIDE POWDER AND MANUFACTURING METHOD FOR SAME

TECHNICAL FIELD

The present invention relates to a silicon carbide powder and a manufacturing method for the same.

BACKGROUND ART

Silicon carbide (SiC) has many excellent characteristics such as high thermal conductivity, microwave heating characteristics, low specific gravity, low thermal expansion coefficient, and high mechanical characteristics (hardness and rigidity), and thus there is a case where silicon carbide is mixed with a dissimilar material and used as a material that imparts these characteristics. For example, there is a case where silicon carbide is blended into a dissimilar material such as a resin, as a heat-dissipating filler or a resin reinforcing material, or a case where silicon carbide and a dissimilar material such as a metal is mixed to manufacture a heat generating material or a metal matrix composite (MMC).

For example, in a case of mixing a powder of silicon carbide with a liquid dissimilar material (for example, a liquid resin or a molten metal) to form a mixture, and manufacturing a composite material from this mixture, there has been a risk that the addition of the powder of silicon carbide causes thickening, and the viscosity of the mixture becomes significantly higher than the viscosity of the liquid dissimilar material in a case where the shape of primary particles of silicon carbide constituting the powder is not a shape having a high sphericity (a shape having a small number of corner portions present on the surface of the particle) but a shape having a low sphericity (a shape having a large number of corner portions present on the surface of the particle). As a result, there has been a risk that problems such as difficulty in highly filling a liquid dissimilar material with a powder of silicon carbide and deterioration of processability at the time of molding a mixture may occur.

The silicon carbide produced using the Acheson furnace is silicon carbide ($\alpha$-SiC) having an $\alpha$-type crystal system; however, since the silicon carbide is formed into a powder shape by a pulverization method, the shape of the primary particles of the obtained silicon carbide has a shape having a low sphericity. As a method of removing corner portions from the surface of the primary particles of silicon carbide having a shape having a low sphericity to form a shape having a high sphericity, there is known a grinding method using a stone mill or the like, a particle collision method using a jet mill or the like (for example, see JP2013-245374A) or the like.

The gist of the silicon carbide powder according to one aspect of the present invention is such that the silicon carbide powder is a powder of silicon carbide having an $\alpha$-type crystal system, in which the number of small corner portions among corner portions on a surface of a primary particle of silicon carbide constituting the powder of silicon carbide is 2.5 or less per one primary particle, and the small corner portion is a corner portion, among corner portions present in a contour of the primary particle in a projection image of the primary particle, where twice a curvature radius of the corner portion is ⅕ or less of a Heywood diameter of the projection image of the primary particle.

A manufacturing method for a silicon carbide powder according to another aspect of the present invention is a manufacturing method for the silicon carbide powder according to the one aspect, the manufacturing method including a heat treatment step of subjecting a powder of silicon carbide as a raw material to a heat treatment to reduce the number of small corner portions on the surface of the primary particle of silicon carbide constituting the powder of silicon carbide as the raw material so that the number of small corner portions is 2.5 or less per one primary particle.

DESCRIPTION OF EMBODIMENTS

Figure 1:
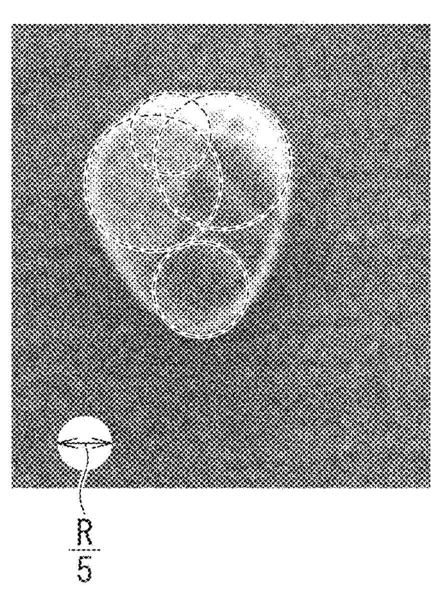
FIG. 1 is an image illustrative of a shape of a primary particle of silicon carbide constituting a silicon carbide powder according to an embodiment of the present invention.

Silicon carbide has a high hardness, and thus, it has been not easy to sufficiently remove corner portions from the surface of the primary particles of silicon carbide to form a shape having a high sphericity by a mechanical treatment method such as a grinding method or a particle collision method. In addition, in such a mechanical treatment method as described above, there has been a risk that a contaminant may be mixed into the powder of silicon carbide from a device that performs the mechanical treatment, and there has been a risk that fine particles due to chipping or the like that occurs at the time when mechanical energy is applied to the primary particles of silicon carbide contribute to the thickening of the liquid dissimilar material due to the addition of the powder of silicon carbide.

Further, although granulation sintering is conceivable as a method of allowing the primary particles of silicon carbide having a shape having a low sphericity to have a shape having a high sphericity, silicon carbide is hardly sinterable, and thus, it is conceived to be difficult to make the primary particles of silicon carbide be sufficiently dense and have a shape having a high sphericity by the granulation sintering.

An object of the present invention is to provide a silicon carbide powder that hardly causes thickening even in a case of being added to a liquid dissimilar material such as a liquid resin or a molten metal, and a manufacturing method for the same.

According to the present invention, it is possible to provide a silicon carbide powder that hardly causes thickening even in a case of being added to a liquid dissimilar material such as a liquid resin or a molten metal.

An embodiment of the present invention will be described in detail. It is noted that the following embodiment shows an example of the present invention, and thus the present invention is not limited to the present embodiment. In addition, various changes or improvements can be added to the following embodiments, and embodiments to which such changes or improvements are added can also be included in the present invention.

The silicon carbide powder according to the present embodiment is a powder of silicon carbide having an $\alpha$-type crystal system, where the number of small corner portions among corner portions on a surface of a primary particle of silicon carbide constituting the powder of silicon carbide is 2.5 or less per one primary particle. Here, the corner portion means a point where the contour line of the primary particle in a projection image of the primary particle changes in terms of angle. In the present embodiment, the angle is more than 0° and less than 180° as an internal angle toward the inside of the contour of the primary particle. In the corner portion, the contour line that forms the corner portion may have a straight line or may have a rounded shape. In addition, the small corner portion is a corner portion, among corner portions present in a contour of the primary particle in the projection image of the primary particle, where twice a curvature radius of the corner portion is 1/5 or less of a Heywood diameter of the projection image of the primary particle.

It is noted that the Heywood diameter is also referred to as a projected area equivalent circle diameter and means a diameter of a circle having the same area as the projected area of a particle, which is obtained by image analysis. In addition, primary particles of silicon carbide are a main constituent of the powder of silicon carbide according to the present embodiment. Further, the primary particle means the smallest particle having a clear contour in a case of being observed using a microscope, for example, as the particle illustrated in FIG. 1.

As described above, in the silicon carbide powder according to the present embodiment, the shape of the primary particle of silicon carbide is a shape having a high sphericity, and thus thickening hardly occurs even in a case of being added to a liquid dissimilar material (for example, a liquid resin or a molten metal). As a result, the viscosity of the mixture of the silicon carbide powder according to the present embodiment and the liquid dissimilar material is about the same as the original viscosity of the liquid dissimilar material, or thickening is not large even in a case where the thickening occurs.

Therefore, a liquid dissimilar material can be highly filled with the silicon carbide powder according to the present embodiment. In addition, the mixture of the silicon carbide powder according to the present embodiment and the liquid dissimilar material has good processability at the time of molding.

Therefore, by adding the silicon carbide powder according to the present embodiment to a liquid dissimilar material, it is possible to impart, to the liquid dissimilar material, excellent characteristics such as high thermal conductivity, microwave heating characteristics, low specific gravity, low thermal expansion coefficient, and high mechanical characteristics (hardness and rigidity). In addition, it is possible to produce a composite material having the above-described excellent characteristics from the mixture of the silicon carbide powder according to the present embodiment and the liquid dissimilar material.

It is noted that the number of small corner portions on the surface of the primary particle of silicon carbide needs to be 2.5 or less per one primary particle, which is preferably 2.2 or less and more preferably 1.2 or less per one primary particle.

In addition, the liquid dissimilar material to be mixed with the silicon carbide powder according to the present embodiment is not particularly limited; however, examples of the liquid dissimilar material include a liquid resin and a molten metal. Examples of the liquid resin include a silicone resin, an epoxy resin, an acrylic resin, and polyurethane, and examples of the molten metal include aluminum, silicon, copper, magnesium, and alloys containing these metals.

The number of small corner portions on the surface of the primary particle of silicon carbide constituting the powder of silicon carbide can be measured, for example, as follows. A powder of silicon carbide is observed using an electron microscope, a secondary electron image of a primary particle of silicon carbide is obtained, and the image analysis of the secondary electron image is carried out using image analysis software. In the image analysis, a projection image of any one primary particle is acquired from the secondary electron image, and the curvature radii of corner portions present in the contour of the primary particle in the projection image (the radii of the maximum circles that can touch the inside of the corner portions) are measured.

Figure 2:
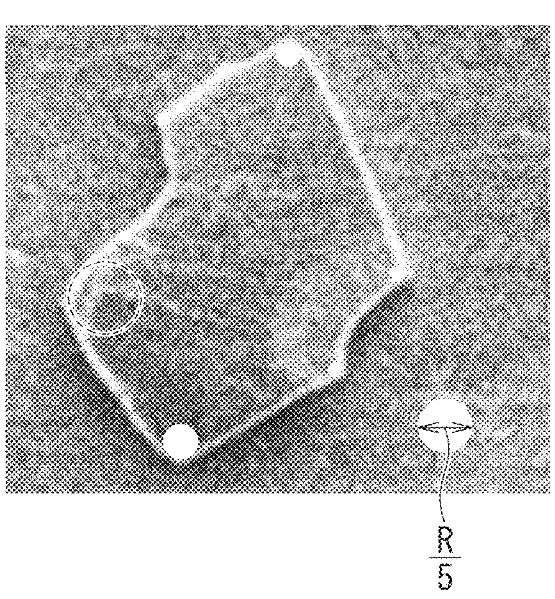
FIG. 2 is an image illustrative of a shape of a primary particle of silicon carbide constituting a silicon carbide powder as a raw material for manufacturing the silicon carbide powder of FIG. 1.

The shape of the projection image of the primary particle of silicon carbide is a substantially polygonal shape as illustrated in FIGS. 1 and 2, and a plurality of corner portions are present in one primary particle. However, only the corner portions between the sides of the substantially polygonal shape are subjected to the analysis (the measurement of curvature radius), but minute uneven portions formed in the middle of the sides are not subjected to the analysis. The minute uneven portion means a corner portion having such a small size that it cannot be visually distinguished from the corner portion in the projection image of the primary particle obtained under the following measurement conditions.

[Measurement Conditions]

<1> Using a laser diffraction/scattering-type particle size distribution analyzer LA-300, manufactured by HORIBA, Ltd., a D50% of a silicon carbide powder to be measured (analyzed) is measured. It is noted that D50% means a particle diameter at which the cumulative particle volume from the small particle diameter side is 50% of the total particle volume in the volume-based cumulative particle diameter distribution which is measured using a laser diffraction/scattering-type particle size distribution analyzer LA-300, manufactured by HORIBA, Ltd.

<2> A secondary electron image of the primary particle of the silicon carbide is obtained with an electron microscope (Phenom Pro-X desktop scanning electron microscope, manufactured by Thermo Fisher Scientific, Inc., electron acceleration voltage: 10 kV). It is noted that magnification is set to any of the following (i) to (iii).

(i) In a powder having a D50% of 100 μm or more, the magnification is set to 300 folds.

(ii) In a powder having a D50% of 40 μm or more and less than 100 μm, the magnification is set to 1,000 folds.

(iii) In a powder having a D50% of less than 40 μm, the magnification is set to 2,000 folds.

<3> The image analysis of the secondary electron image was carried out using the image analysis software Mac-View manufactured by MOUNTECH Co., Ltd. to obtain projection images of any 100 or more silicon carbide primary particles in the secondary electron image.

For example, the projection images of the primary particles of FIGS. 1 and 2, corner portions with a circle drawn by a dotted line or a white circle are corner portions where the curvature radius has been measured. In addition, the circle drawn by the dotted line and the white circle are circles of which radii are the curvature radii of the corresponding corner portions.

Next, image analysis is further carried out to calculate the Heywood diameter R with respect to the projection image of the primary particle which has been subjected to the measurement of the curvature radius of the corner portion. That is, the diameter of a circle having the same area as the area of the projection image of the primary particle is calculated. Then, with respect to the projection image of the primary particle, the number of corner portions (hereinafter, referred to as "small corner portions"), where twice the curvature radius is one-fifth or less of the Heywood diameter R, is counted. In the projection image of the primary particle in FIG. 1, there are no small corner portions, and in the projection image of the primary particle in FIG. 2, there are five small corner portions.

It is noted that in FIGS. 1 and 2, the white circle drawn outside the projection image of the primary particle is a circle having a diameter of one-fifth (R/5) of the Heywood diameter R. In addition, the corner portion with a white circle is the small corner portion, and the corner portion with a circle drawn with dotted lines is a corner portion where twice the curvature radius is more than one-fifth of the Heywood diameter R (that is, a corner portion that is not the small corner portion).

With respect to each of the projection images of a plurality of primary particles (for example, 50 primary particles) in the secondary electron image, the same analysis as described above is carried out, the curvature radius of the corner portion is measured, while the Heywood diameter R being calculated, and the number of small corner portions was counted. Then, the average value of the number of small corner portions is calculated with respect to each of the plurality of primary particles, whereby the number of small corner portions per one primary particle is calculated.

It is noted that FIG. 1 is a projection image of primary particles of silicon carbide constituting the silicon carbide powder according to the present embodiment. In addition, FIG. 2 is a projection image of primary particles of silicon carbide constituting the silicon carbide powder as a raw material for manufacturing the silicon carbide powder of FIG. 1.

The aspect ratio of the primary particle of silicon carbide is preferably 1.44 or less. In a case where the aspect ratio is 1.44 or less, thickening is less likely to occur in a case where the silicon carbide powder according to the present embodiment is added to a liquid dissimilar material such as a liquid resin or a molten metal. The aspect ratio of the primary particles of silicon carbide is more preferably 1.42 or less and still more preferably 1.36 or less. It is noted that the aspect ratio of the primary particle of silicon carbide is a ratio of the major axis to the minor axis of the primary particle. Here, among the circumscribed quadrangles (rectangles) of the primary particle, the long side of the circumscribed quadrangle having the smallest area was defined as the major axis, and the short side of the circumscribed quadrangle was defined as the minor axis, and the aspect ratio was calculated based on the major axis and the minor axis.

In addition, in the silicon carbide powder according to the present embodiment, the particle diameter D50% is preferably 1 μm or more and 300 μm or less, where the particle diameter D50% is a value at which the cumulative particle volume from the small particle diameter side in the volume-based cumulative particle diameter distribution is 50% of the total particle volume. In such a case, thickening is less likely to occur in a case where the silicon carbide powder according to the present embodiment is added to a liquid dissimilar material such as a liquid resin or a molten metal. The particle diameter D50% of the silicon carbide powder according to the present embodiment is more preferably 10 μm or more and 190 μm or less and still more preferably 40 μm or more and 185 μm or less. A method of measuring the particle diameter D50% of the silicon carbide powder according to the present embodiment is not particularly limited; however, it can be measured by, for example, a laser diffraction/scattering method.

The evaluation of the silicon carbide powder according to the present embodiment can be carried out based on the viscosity of a resin composition obtained by mixing with a liquid resin. For example, 73 parts by mass of the silicon carbide powder according to the present embodiment and 27 parts by mass of the silicone resin are mixed to obtain a resin composition, and the viscosity of this resin composition is measured with a rheometer at a measurement temperature of 25° C. and a shear rate of 1 $s^{-1}$, whereby the silicon carbide powder according to the present embodiment can be evaluated. In a case where the number of small corner portions on the surface of the primary particle of silicon carbide is 2.5 or less per one primary particle, thickening hardly occurs as compared with a case where the shape of the primary particle of silicon carbide is a shape having a low sphericity even in a case of being added to a liquid dissimilar material such as a liquid resin or a molten metal.

In addition, the silicon carbide powder according to the present embodiment contains silicon carbide as a main component; however, it may contain an element other than silicon and carbon. Examples of the kind of the element other than silicon and carbon include aluminum, yttrium, beryllium, magnesium, and boron.

Next, a manufacturing method for a silicon carbide powder according to the present embodiment will be described. That is, the manufacturing method for a silicon carbide powder according to the present embodiment is a manufacturing method for the silicon carbide powder according to the present embodiment, the manufacturing method including a heat treatment step of subjecting a powder of silicon carbide as a raw material to a heat treatment to reduce the number of small corner portions on the surface of the primary particle of silicon carbide constituting the powder of silicon carbide as the raw material so that the number of small corner portions is 2.5 or less per one primary particle.

In the powder of silicon carbide as a raw material, the number of small corner portions on the surface of the primary particle of silicon carbide is large, and the number of small corner portions per one primary particle is more than 2.5. In a case where the powder of silicon carbide as a raw material is subjected to a heat treatment, atomic diffusion or substance movement occurs so that the surface energy and the grain boundary energy are reduced, and thus the corner portions on the surface of the primary particle of silicon carbide are rounded. As a result, the corner portion where twice the curvature radius is more than one-fifth of the Heywood diameter R becomes a small corner portion, and thus the shape of the primary particle of silicon carbide becomes a shape having a high sphericity. For example, by heat treatment, the primary particle illustrated in FIG. 2 becomes the primary particle illustrated in FIG. 1. As a result, the number of small corner portions per one primary particle is 2.5 or less.

According to the manufacturing method for a silicon carbide powder according to the present embodiment, it is possible to easily manufacture the silicon carbide powder according to the present embodiment even in a case of silicon carbide having high hardness.

In addition, according to the manufacturing method for a silicon carbide powder according to the present embodiment, it is possible to sufficiently remove, only with a heat treatment, corner portions from the surface of the primary particles of silicon carbide having a shape having a low sphericity so that the primary particles have a shape having a high sphericity, and thus it is possible to manufacture the silicon carbide powder according to the present embodiment by a method that is easy as compared with the mechanical treatment method described above.

Further, according to the manufacturing method for a silicon carbide powder according to the present embodiment, a contaminant is less likely to be mixed into the powder of silicon carbide during the treatment as compared with the mechanical treatment method described above. Further, according to the manufacturing method for a silicon carbide powder according to the present embodiment, fine particles due to chipping or the like are less likely to be generated in the primary particles of silicon carbide during the treatment. Furthermore, in the manufacturing method for the silicon carbide powder according to the present embodiment, it is possible to manufacture the silicon carbide powder according to the present embodiment by a method that is easy as compared with granulation sintering.

The conditions of the heat treatment are not particularly limited; however, the temperature condition is preferably 1,700° C. or higher and 2,300° C. or lower, more preferably 1,750° C. or higher and 2,250° C. or lower, and still more preferably 1,800° C. or higher and 2,200° C. or lower.

In addition, the atmosphere during the heat treatment is preferably an inert gas atmosphere. The kind of inert gas is not particularly limited; however, examples of the kind of inert gas include gases such as nitrogen, helium, argon, neon, xenon, and krypton.

At the time of manufacturing the silicon carbide powder according to the present embodiment, a liquid phase forming aid may be mixed with the powder of silicon carbide as the raw material, and an obtained mixture is subsequently subjected to the heat treatment step. In such a case, since the corner portions on the surface of the primary particle of silicon carbide are rounded, and the corner portions where twice the curvature radius is more than one-fifth of the Heywood diameter R are likely to be small corner portions, the number of small corner portions per one primary particle is likely to be 2.5 or less.

In detail, since silicon carbide has a strong covalent bonding property and a low self-diffusibility, substance movement is difficult to proceed. As a result, it can be said that silicon carbide is such a substance that the corner portions on the surface of the primary particle are not easily rounded. Therefore, attention was paid to a liquid phase forming aid in order to promote the substance movement. In a case where a liquid phase forming aid is mixed with the silicon carbide powder, the liquid phase forming aid adheres to the surface of the primary particles of silicon carbide. In a case where a heat treatment is carried out in a state where the liquid phase forming aid had adhered, the liquid phase forming aid and the silicon dioxide present on the surface of the primary particles of silicon carbide react with each other at a high temperature to form a melt (liquid phase) of a mixture, and this melt covers the surface of the primary particles of silicon carbide.

Subsequently, atomic diffusion or substance movement is promoted by the melt that has covered the surface of the primary particle of silicon carbide, and the silicon carbide melts into the melt. Then, the external shape of the primary particles of silicon carbide becomes a shape having a high sphericity due to the surface tension of the melt, and as a result, the primary particles having a shape having a high sphericity can be obtained by the solidification of the melt.

The kind of the liquid phase forming aid is not particularly limited. However, examples thereof include an aluminum-containing substance and an yttrium-containing substance, and examples of the aluminum-containing substance and the yttrium-containing substance include an aluminum salt, an yttrium salt, aluminum oxide, and yttrium oxide. Specific examples of the aluminum salt include aluminum nitrate ($Al(NO_3)_3$), aluminum chloride, aluminum sulfate, aluminum acetate, aluminum lactate, and hydrates of these aluminum salts.

Since there is a case where in the silicon carbide powder that has undergone the heat treatment step, the primary particles may aggregate, the silicon carbide powder may be subjected to pulverization using a centrifugal pulverizer or the like or classification using a sieve or the like, after the heat treatment step.

EXAMPLES

Hereinafter, the present invention will be described in more detail with reference to Examples and Comparative Examples.

Comparative Example 1

A powder of silicon carbide having an α-type crystal system (silicon carbide GC If 320, manufactured by FUJIMI INCORPORATED) was prepared, and this was used as silicon carbide powder of Comparative Example 1.

Using a laser diffraction/scattering-type particle size distribution analyzer LA-300, manufactured by HORIBA, Ltd., the D10%, D50%, and D90% of the silicon carbide powder of Comparative Example 1 were measured.

The results are shown in Table 1. It is noted that D10% is a particle diameter at which the cumulative particle volume from the small particle diameter side in the volume-based cumulative particle diameter distribution is 10% of the total particle volume, and D90% is a particle diameter at which it is 90% in terms of the description above.

Figure 4:
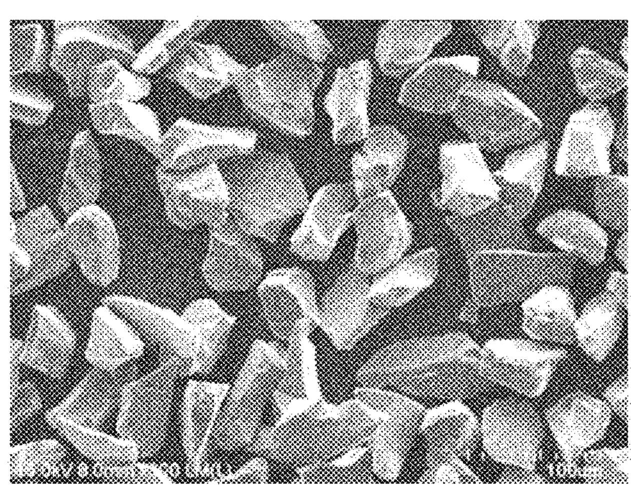
FIG. 4 is an image illustrative of primary particles of silicon carbide constituting a silicon carbide powder of Comparative Example 1.

In addition, the aspect ratio of the primary particles of silicon carbide constituting the silicon carbide powder of Comparative Example 1 was calculated by image analysis. That is, the powder of silicon carbide was observed using a scanning electron microscope SU8000 (electron acceleration voltage: 15 kV, magnification: 150 to 250 folds) manufactured by Hitachi High-Tec. Corporation, and a secondary electron image of the primary particles of the silicon carbide (see FIG. 4) obtained. Then, the image analysis of the secondary electron image was carried out using the image analysis software Mac-View manufactured by MOUNTECH Co., Ltd. to measure the major axis and the minor axis with respect to each of the projection images of any 100 or more silicon carbide primary particles in the secondary electron image, and the average major axis and the average minor axis were calculated. Subsequently, using the obtained values of the average major axis and the average minor axis, the ratio (average major axis/average minor axis) of the major axis to the minor axis was calculated to calculate the aspect ratio. The results are shown in Table 1.

In addition, the number of small corner portions among the corner portions on the surface of the primary particle of silicon carbide constituting the silicon carbide powder of Comparative Example 1 was calculated by the image analysis of the secondary electron image of the primary particles of silicon carbide. That is, the secondary electron image of the primary particles of the silicon carbide used for the calculation of the aspect ratio was subjected to the image analysis using the image analysis software Mac-View to calculate the number of small corner portions. The details will be described below.

In the image analysis, a projection image of any one primary particle was acquired from the secondary electron image, and the curvature radii of corner portions present in the contour of the primary particle in the projection image (the radii of the maximum circles that can touch the inside of the corner portions) were measured. The shape of the projection image of the primary particle of silicon carbide is a substantially polygonal shape as illustrated in FIGS. 1 and 2, and a plurality of corner portions are present in one primary particle. However, only the corner portions between the sides of the substantially polygonal shape are subjected to the analysis (the measurement of curvature radius), but minute uneven portions formed in the middle of the sides are not subjected to the analysis.

Next, image analysis was further carried out to calculate the Heywood diameter R with respect to the projection image of the primary particle which had been subjected to the measurement of the curvature radius of the corner portion. Then, with respect to the projection image of the primary particle, the number of small corner portions, where twice the curvature radius was one-fifth or less of the Heywood diameter R, was counted.

With respect to each of the projection images of any primary particles in the secondary electron image, the same analysis as described above was carried out, the curvature radius of the corner portion was measured, while the Heywood diameter R being calculated, and the number of small corner portions was counted. Then, the average value of the number of small corner portions was calculated with respect to each of the 50 primary particles, whereby the number of small corner portions per one primary particle was calculated. The results are shown in Table 1.

Next, 73 parts by mass of the silicon carbide powder of Comparative Example 1 and 27 parts by mass of the silicone resin which is a liquid resin were mixed by stirring at a rotation speed of 2,000 rpm for 2 minutes using a rotation revolution mixer to prepare a slurry-shaped resin composition. A silicone oil (dimethyl silicone oil) (product name element: 14 PDMS series, manufactured by Momentive Inc.) was used as the silicone resin.

Then, the viscosity of this resin composition was measured using a rheometer MCR302 manufactured by Anton Paar GmbH. A parallel plate having a diameter of 49.974 mm was used as a measurement jig for the rheometer. Regarding the measurement conditions, the measurement temperature was set to 25° C., the shear rate was set to 1 $s^{-1}$, and the gap between the parallel plates was set to 1 mm. The results are shown in Table 1. It is noted that as a result of also measuring the viscosity of the silicone oil at 25° C., which had been used in the resin composition, in the same manner as in the resin composition, it was 1.1 Pa·s.

TABLE 1

| | Raw material | Liquid phase forming aid | Heat treatment conditions | Pulverization | Classification | Number of small corner portions (portions/particle) | Aspect ratio | Average particle diameter (μm) D10% | D50% | D90% | Viscosity (Pa · s) |
|---|---|---|---|---|---|---|---|---|---|---|---|
| Comp. Ex. 1 | GC # 320 | Absent | Absent | No | No | 4.88 | 1.53 | 34.33 | 51.31 | 78.38 | 152.2 |
| Ex. 1 | GC # 320 | Absent | 2,000° C./4 h | Yes | No | 2.22 | 1.41 | 31.46 | 47.36 | 72.54 | 54.0 |
| Ex. 2 | GC # 320 | Present | 2,000° C./4 h | Yes | No | 0.30 | 1.35 | 31.48 | 47.51 | 74.25 | 25.9 |
| Comp. Ex. 2 | GC # 240 | Absent | Absent | No | No | 4.86 | 1.45 | 52.79 | 80.40 | 128.99 | 147.9 |
| Ex. 3 | GC # 240 | Present | 2,030° C./4 h | Yes | Yes | 1.02 | 1.41 | 53.70 | 82.28 | 132.05 | 58.4 |
| Comp. Ex. 3 | 1) | Absent | Absent | No | No | 4.02 | 1.69 | 11.70 | 16.90 | 25.30 | 241.7 |
| Ex. 4 | 1) | Absent | 1,830° C./4 h | Yes | Yes | 1.19 | 1.46 | 11.09 | 15.95 | 23.16 | 28.0 |
| Comp. Ex. 4 | 2) | Absent | Absent | No | No | 4.78 | 1.94 | 74.47 | 117.00 | 194.18 | 149.0 |
| Ex. 5 | 2) | Present | 2,110° C./4 h | Yes | Yes | 1.58 | 1.64 | 74.41 | 120.24 | 207.37 | 61.8 |

1) Silicon carbide powder having average particle diameter of 17 μm
2) Silicon carbide powder having average particle diameter of 117 μm Example 1

As a raw material for manufacturing a silicon carbide powder of Example 1, the silicon carbide powder of Comparative Example 1 was used. That is, the silicon carbide powder of Comparative Example 1 was subjected to a heat treatment using a baking furnace to manufacture the silicon carbide powder of Example 1. It is noted that the heat treatment temperature is 2,000° C., the heat treatment time is 4 hours, and the atmosphere at the time of the heat treatment is argon. A partial aggregation of the primary particles occurred in the silicon carbide powder after the heat treatment, and thus it was pulverized using a centrifugal pulverizer. It is noted that the rotation speed of the centrifugal pulverizer is 6,000 rpm.

Regarding the silicon carbide powder of Example 1 manufactured as described above, D10%, D50%, D90%, aspect ratio, the number of small corner portions per one primary particle, and the viscosity of the resin composition were each measured according to the same method as in the case of Comparative Example 1. These results are summarized in Table 1.

Example 2

A silicon carbide powder of Example 2 was manufactured in the same manner as in Example 1, except that a liquid phase forming aid was used at the time of the heat treatment.

The heat treatment step will be described. First, 100 parts by mass of the silicon carbide powder as a raw material and 30 parts by mass of aluminum nitrate nonahydrate were put into water and mixed to be slurry-shaped, which was subsequently heated to 110° C. to evaporate the water. Next, the obtained mixture of the silicon carbide powder and the aluminum nitrate was placed in a baking furnace, subjected to a heat treatment in the same manner as in Example 1, and then pulverized.

Figure 3:
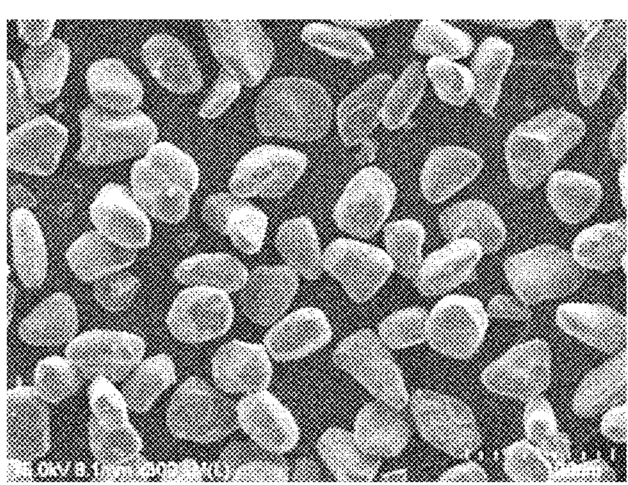
FIG. 3 is an image illustrative of primary particles of silicon carbide constituting a silicon carbide powder of Example 2.

Regarding the silicon carbide powder of Example 2 manufactured as described above, D10%, D50%, D90%, aspect ratio, the number of small corner portions per one primary particle, and the viscosity of the resin composition were each measured according to the same method as in the case of Comparative Example 1. These results are summarized in Table 1. The secondary electron image of the primary particles of the silicon carbide powder of Example 2 is illustrated in FIG. 3.

Comparative Example 2

A powder of silicon carbide having an α-type crystal system (silicon carbide GC #240, manufactured by FUJIMI INCORPORATED) was prepared, and this was used as a silicon carbide powder of Comparative Example 2. Then, D10%, D50%, D90%, aspect ratio, the number of small corner portions per one primary particle, and the viscosity of the resin composition were each measured according to the same method as in the case of Comparative Example 1. These results are summarized in Table 1.

Example 3

A silicon carbide powder of Example 3 was manufactured in the same manner as in Example 2, except that the silicon carbide powder of Comparative Example 2 was used as a raw material, that the heat treatment temperature was set to 2,030° C., and that after the pulverization, classification (removal of aggregates) was carried out using a sieve having a sieve opening of 90 μm. Then, D10%, D50%, D90%, aspect ratio, the number of small corner portions per one primary particle, and the viscosity of the resin composition were each measured according to the same method as in the case of Comparative Example 1. These results are summarized in Table 1.

Example 4

A powder of silicon carbide having an α-type crystal system and an average particle diameter of 17 μm was subjected to a heat treatment using a baking furnace. It is noted that the heat treatment temperature is 1,830° C., the heat treatment time is 4 hours, and the atmosphere at the time of the heat treatment is argon.

A partial aggregation of the primary particles occurred in the silicon carbide powder after the heat treatment, and thus it was pulverized using a centrifugal pulverizer. It is noted that the rotation speed of the centrifugal pulverizer is 18,000 rpm. Then, the pulverized silicon carbide powder was subjected to classification using a sieve having a sieve opening of 38 μm to obtain a silicon carbide powder of Example 4.

Regarding the silicon carbide powder of Example 4 manufactured as described above, D10%, D50%, D90%, aspect ratio, the number of small corner portions per one primary particle, and the viscosity of the resin composition were each measured according to the same method as in the case of Comparative Example 1. However, the secondary electron image of the primary particle of the silicon carbide, which would be used for the image analysis, was obtained using a Phenom Pro-X desktop scanning electron microscope (electron acceleration voltage: 10 kV, magnification: 2,000 folds) manufactured by Thermo Fisher Scientific, Inc. These results are summarized in Table 1.

Example 5

A mixed powder was obtained by dry-mixing 100 parts by mass of a powder of silicon carbide having an α-type crystal system and an average particle diameter of 117 μm and 4.8 parts by mass of an aluminum oxide powder. Then, the mixed powder was subjected to a heat treatment using a baking furnace. It is noted that the heat treatment temperature is 2,110° C., the heat treatment time is 4 hours, and the atmosphere at the time of the heat treatment is argon.

A partial aggregation of the primary particles occurred in the mixed powder after the heat treatment, and thus it was pulverized using a centrifugal pulverizer. It is noted that the rotation speed of the centrifugal pulverizer is 6,000 rpm. Then, the pulverized silicon carbide powder was subjected to classification using a sieve having a sieve opening of 180 μm to obtain a silicon carbide powder of Example 5.

Regarding the silicon carbide powder of Example 5 manufactured as described above, D10%, D50%, D90%, aspect ratio, the number of small corner portions per one primary particle, and the viscosity of the resin composition were each measured according to the same method as in the case of Comparative Example 1. However, the secondary electron image of the primary particle of the silicon carbide, which would be used for the image analysis, was obtained using a Phenom Pro-X desktop scanning electron microscope (electron acceleration voltage: 10 kV, magnification: 300 folds) manufactured by Thermo Fisher Scientific, Inc. These results are summarized in Table 1.

Comparative Example 3

A powder of silicon carbide having an α-type crystal system and an average particle diameter of 17 μm was prepared, and this was used as a silicon carbide powder of Comparative Example 3. Then, D10%, D50%, D90%, aspect ratio, the number of small corner portions per one primary particle, and the viscosity of the resin composition were each measured according to the same method as in the case of Example 4. These results are summarized in Table 1.

Comparative Example 4

A powder of silicon carbide having an α-type crystal system and an average particle diameter of 117 μm was prepared, and this was used as a silicon carbide powder of Comparative Example 4. Then, D10%, D50%, D90%, aspect ratio, the number of small corner portions per one primary particle, and the viscosity of the resin composition were each measured according to the same method as in the case of Example 5. These results are summarized in Table 1.

As can be seen from the results shown in Table 1, in the silicon carbide powders of Comparative Examples 1 to 4, the number of small corner portions per one primary particle exceeds 2.5, and thus thickening occurs by the addition of the silicon carbide powder, and the viscosity of the resin composition is high. As a result, it is conceived that a liquid dissimilar material is difficult to be highly filled with the silicon carbide powders of Comparative Examples 1 to 4. In addition, it is conceived that the mixture of each of the silicon carbide powders of Comparative Examples 1 to 4 and the liquid dissimilar material has bad processability at the time of molding.

On the other hand, in the silicon carbide powders of Examples 1 to 5, the number of small corner portions per one primary particle is 2.5 or less, and thus thickening due to the addition of the silicon carbide powder is small, and the viscosity of the resin composition is low. In particular, in the silicon carbide powder of Example 2, the number of small corner portions per one primary particle is very small, and thus thickening due to the addition of the silicon carbide powder is very small, and the viscosity of the resin composition is extremely low.

As a result, it is conceived that a liquid dissimilar material is easy to be highly filled with the silicon carbide powders of Examples 1 to 5. In addition, it is conceived that the mixture of each of the silicon carbide powders of Examples 1 to 5 and the liquid dissimilar material has good processability at the time of molding.

The invention claimed is:

1. A silicon carbide powder that is a powder of silicon carbide having an α-type crystal system, wherein the number of small corner portions among corner portions on a surface of a primary particle of silicon carbide constituting the powder of silicon carbide is 2.5 or less per one primary particle, and the small corner portion is such a corner portion, among corner portions present in a contour of the primary particle in a projection image of the primary particle, that twice a curvature radius of the corner portion is ⅕ or less of a Heywood diameter of the projection image of the primary particle, wherein a particle diameter D50% is 1 μm or more and 300 μm or less, where the particle diameter D50% is a value at which a cumulative particle volume from a small particle diameter side in a volume-based cumulative particle diameter distribution is 50% of a total particle volume.

2. The silicon carbide powder according to claim 1, wherein the primary particle has an aspect ratio of 1.44 or less.

3. A manufacturing method for the silicon carbide powder according to claim 1, the manufacturing method comprising:

a heat treatment step of subjecting a powder of silicon carbide as a raw material to a heat treatment to reduce the number of small corner portions on the surface of the primary particle of silicon carbide constituting the powder of silicon carbide as the raw material so that the number of small corner portions is 2.5 or less per one primary particle.

4. The manufacturing method for a silicon carbide powder according to claim 3, wherein a liquid phase forming aid is mixed with the powder of silicon carbide as the raw material, and an obtained mixture is subsequently subjected to the heat treatment step.

5. The manufacturing method for a silicon carbide powder according to claim 4, wherein the liquid phase forming aid is an aluminum-containing substance.

6. A manufacturing method for the silicon carbide powder according to claim 2, the manufacturing method comprising:

a heat treatment step of subjecting a powder of silicon carbide as a raw material to a heat treatment to reduce the number of small corner portions on the surface of the primary particle of silicon carbide constituting the powder of silicon carbide as the raw material so that the number of small corner portions is 2.5 or less per one primary particle.

7. The manufacturing method for a silicon carbide powder according to claim 6, wherein a liquid phase forming aid is mixed with the powder of silicon carbide as the raw material, and an obtained mixture is subsequently subjected to the heat treatment step.

8. The manufacturing method for a silicon carbide powder according to claim 7, wherein the liquid phase forming aid is an aluminum-containing substance.

9. The manufacturing method for a silicon carbide powder according to claim 4, wherein the liquid phase forming aid is an aluminum-containing substance.

10. The manufacturing method for a silicon carbide powder according to claim 9, wherein a liquid phase forming aid is mixed with the powder of silicon carbide as the raw material, and an obtained mixture is subsequently subjected to the heat treatment step.

11. The manufacturing method for a silicon carbide powder according to claim 10, wherein the liquid phase forming aid is an aluminum-containing substance.

* * * * *